United States Patent [19]

Woock et al.

[11] 4,379,419
[45] Apr. 12, 1983

[54] PANEL GROOVING APPARATUS

[76] Inventors: Jean P. Woock, 5, Rue d'Aquitaine, Reichstett, 67460 - Souffelweyersheim; Christian Baerst, 8, Rue de la Liberte, 67380 - Lingolsheim, both of France

[21] Appl. No.: 165,459

[22] Filed: Jul. 2, 1980

[30] Foreign Application Priority Data

Jul. 6, 1979 [FR] France .................................. 79 18306

[51] Int. Cl.³ ............................................. B26D 3/06
[52] U.S. Cl. ......................................... 83/875; 33/437; 83/468; 83/614; 83/648; 83/859
[58] Field of Search .................................. 83/875–879, 83/887, 467, 468, 859, 648, 614; 33/32 C, 32 G, 32 B, 419, 433, 437

[56] References Cited

U.S. PATENT DOCUMENTS

| 1,096,271 | 5/1914 | Shaffer | 83/468 |
| 2,273,716 | 2/1942 | Louviaux et al. | 33/32 C |
| 2,957,244 | 10/1960 | Brewer et al. | 33/437 X |
| 3,274,868 | 9/1966 | Williams | 83/875 X |
| 3,935,767 | 2/1976 | McClay, Jr. | 83/875 X |

FOREIGN PATENT DOCUMENTS 650225  2/1951  United Kingdom ................. 83/468

Primary Examiner—James M. Meister
Attorney, Agent, or Firm—Benoit Law Corporation

[57] ABSTRACT

A panel grooving apparatus has a table for supporting a panel at a working level. A rail extends along a side of the table and a working assembly is mobile on that rail. The working assembly is selectively immobilized in various grooving positions by stops movable and selectively arrestable along the rail and engageable by part of said working assembly. The panel is releasably retained on the table by movable peripheral elements thereon. In a simplified embodiment, the working table may be reduced to a ruler on which a shoe of a rectilinear guide slides.

10 Claims, 7 Drawing Figures

PANEL GROOVING APPARATUS

BACKGROUND OF THE INVENTION

1. Field of the Invention

The subject invention relates to apparatus, methods and systems for tracing grooving and/or cutting insulating materials, wood and other substances that typically are in panel form and, from a particular aspect thereof, relates to a dismountable and transportable table for tracing, grooving and cutting panels of insulating material, particularly with a view to the fabrication of ventilation or air conditioning shafts or flues.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Grooving patterns form transversal folding, creasing or bending lines for the manufacture, from panels, of insulated ventilation shafts of square or rectangular cross-section or of insulated air movement or extraction ducts in dwellings and public or private buildings and localities.

In Europe, such shafts customarily are fabricated by folding panels along several parallel grooves provided in such panels. One folds the panel about the groovings for forming the corners of the lateral surfaces.

The shaft sections thus formed are assembled piece by piece. The cutting and above all the grooving of the panels are all done manually. Persons occupied with carrying out this job place the panel to be grooved on a table and manually trace on each side of the panel the necessary markings for indicating the grooving lines in pencil or any other marker with the aid of a ruler. The grooving and cutting operation is thereafter carried out by hand with a manual cutting tool moved along a rectilinear guide preliminarily placed at the level of the trace.

Such manual method, carried out entirely by hand without the aid of apparatus, imposes several inconveniences in practice and fails to assure the requisite parallelism of the groovings and the desired precision of their placement.

Notorious consequences of such drawbacks include errors, awkwardness, slowness, bad work, shafts which are badly constructed, difficult to assemble, and often present structural deviations prejudicial to the quality of the air distribution or aspiration system and prejudical to conservation of energy through insulation.

Moreover, the manual execution of the required dimensions is arduous. In particular, such method is inefficient and, in effect, is opposed to industrial necessities in terms of large-scale production at identical dimensions.

Known methods also render it practically impossible to cut the panels at the construction site for in situ adjustments to the peculiarities of each installation. Fabricated shafts, on the other hand, are not easily transported.

Unfortunately, immense amounts of energy therefore continue to be lost continuously all over the United States, in summer as well as in winter.

SUMMARY OF THE INVENTION

It is a general object of this invention to remedy the drawbacks and alleviate the needs expressed or implicit in the above disclosure statement or in other parts hereof.

It is a related object of the invention to provide improved apparatus, methods and systems for tracing, grooving and/or cutting insulating materials, wood and other substances.

It is a germane object of this invention to provide improved apparatus or tables for executing desired grooving systems properly and free of error.

It is also an object of this invention to execute grooving patterns in great series at unprecedented regularity and efficiency.

It is a related object of this invention to provide apparatus or tables of the above mentioned type which are easily transported from job site to job site and are readily adjustable for usage on each job.

It is also an object of this invention to provide the above mentioned methods, apparatus and systems so that workers preferably may continue to use the manual tracing, grooving and cutting tools to which they are habitually accustomed in their work.

It is also an object to provide apparatus of the above mentioned type which are quickly amortized in terms of gain realized from their practical use, and which preserve and create jobs, rather than replacing workers.

It is a further object of this invention to provide for superior insulation of buildings, air ducts and other structures in the interest of energy conservation and improved ecology.

Other objects will become apparent in the further course of this disclosure.

From a first aspect thereof, the subject invention resides in panel grooving apparatus, and, more specifically, resides in the improvement comprising, in combination, a table for supporting a panel at a working level, a rail along a side of the table, a working assembly mobile on said rail, means for selectively immobilizing said working assembly in various grooving positions, including steps movable and selectively arrestable along said rail and engageable by part of said working assembly, and movable peripheral elements on said table for releasably retaining said panel.

According to the subject invention, various carriage, rail and/or panel retention structures are included in the latter combination, as more fully disclosed below and as defined in the claims.

In parts of the subject disclosure and in the appendant claims, the expression "grooving" is intended to be generic, including, for instance, tracing and/or cutting, where the latter expressions have not specifically been mentioned.

BRIEF DESCRIPTION OF THE DRAWINGS

The invention and its objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
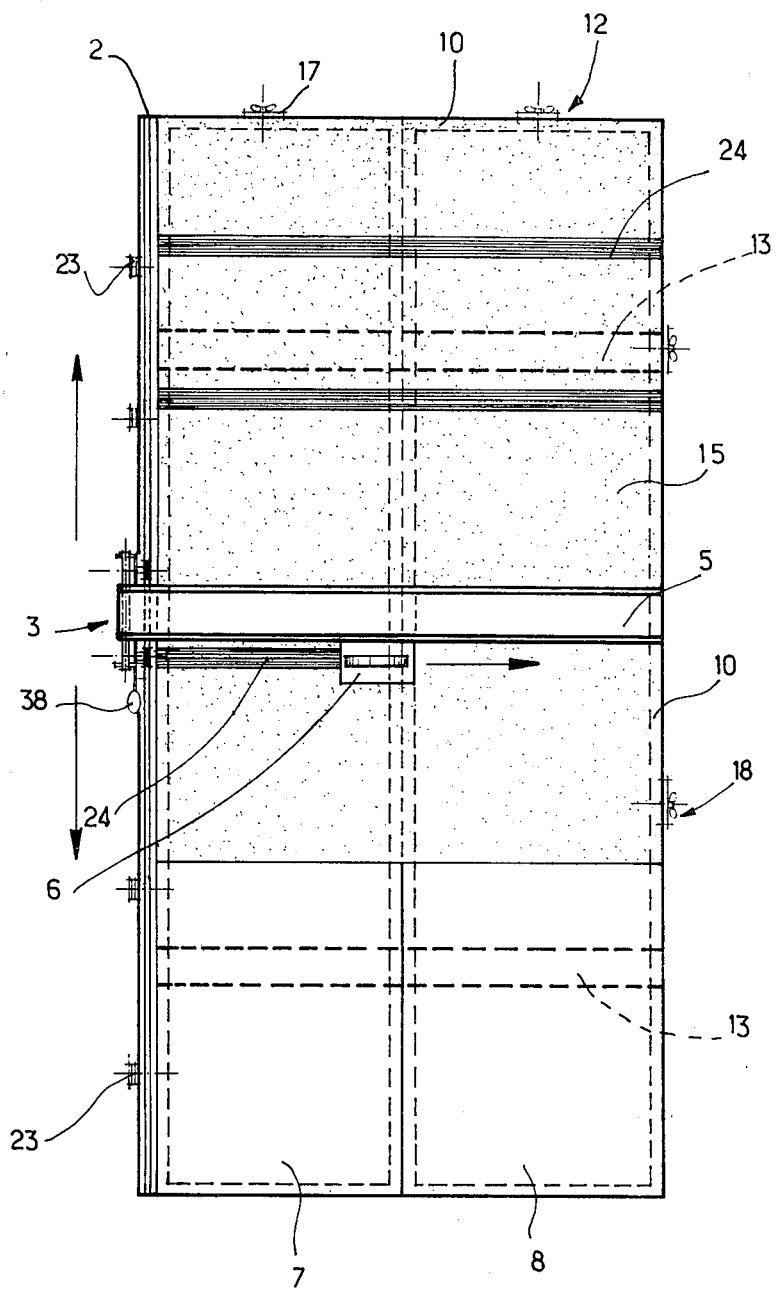
FIG. 1 is a top view of a panel grooving apparatus and working table according to a preferred embodiment of the subject invention.
Figure 2:
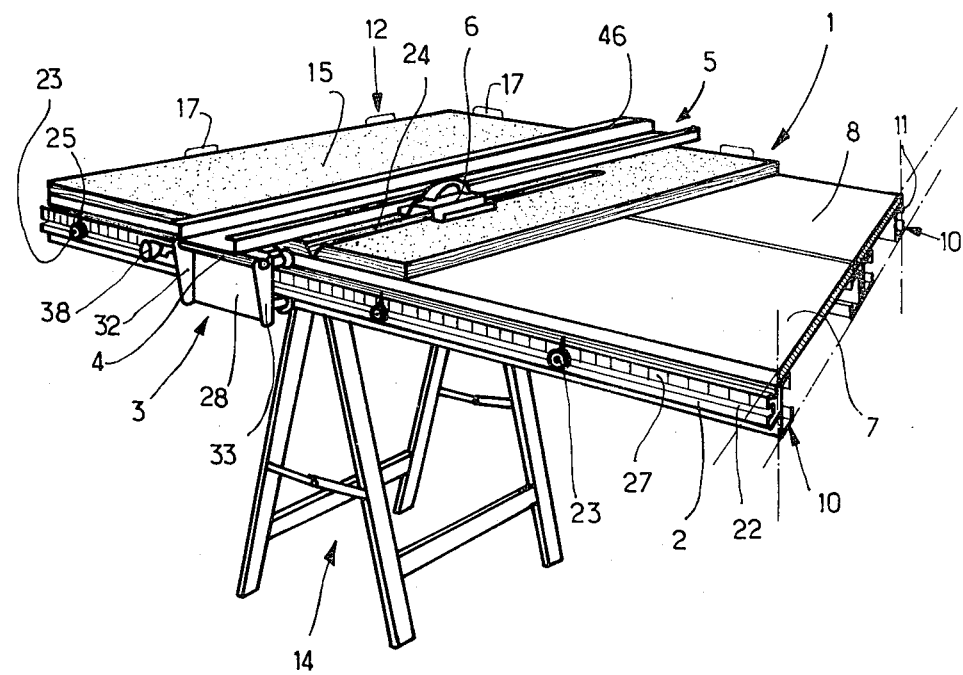
FIG. 2 is a perspective view of the working area of that apparatus.
Figure 3:
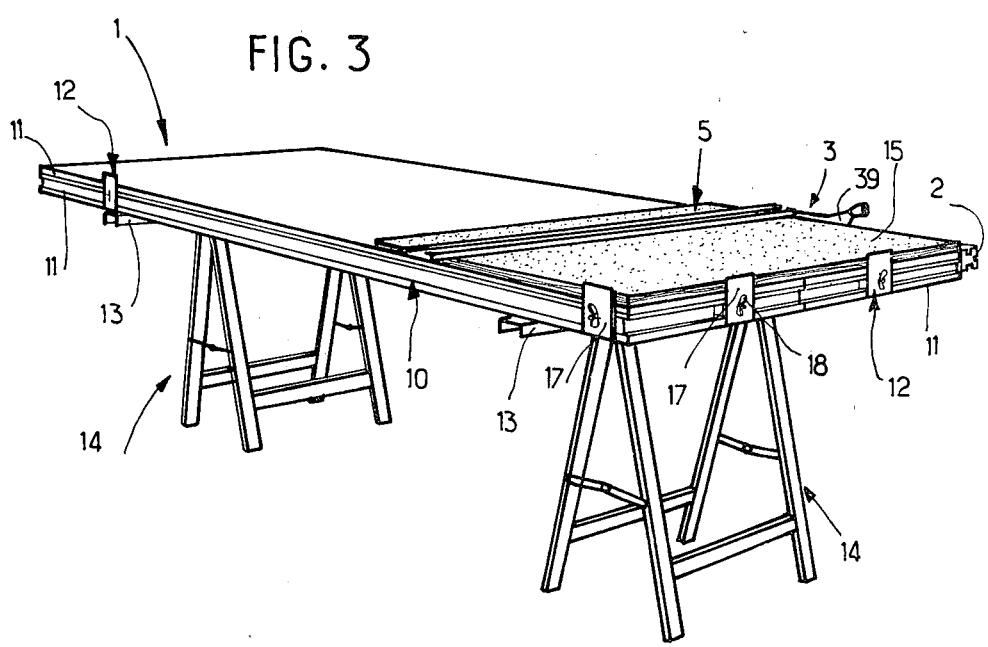
FIG. 3 is a perspective view of the entire apparatus.

The illustrated apparatus for marking and grooving or cutting plates or panels of insulating material according to a preferred embodiment of the subject invention comprises a working surface or table 1, a profiled bar or rail 2 for sliding or rolling action, attached to and extending along one of the long sides of the table 1 and serving as a guide and a rolling track for a carriage 3 connected by an articulate joint 4 to a rectilinear element 5 constituting a guiding tool or means for a hand tool 6 of a known or suitable type enabling execution or cutting of rectilinear apertures or grooves in materials, corresponding to folding, butting or cutting lines at desired or required dimensions according to specific assembly tasks.

The working table or table leaf 1 preferably is composed of two parts made of wooden boards or sheet metal, such as two panels 7 and 8 of equal or similar dimensions juxtaposed along their long sides, such as shown in the drawings.

These panels are integrally mounted on a chassis 9 formed, for example, from a peripheral frame assembly of profiled metal bars 10 of U-shaped cross-section providing two borders or edges, such as at 11, permitting peripherally arranged mobile retention or wedging lugs to be displaced or slided therealong.

The panels 7 and 8 rest on the upper flanges of the profiled bars 10 and are joined thereon, such as by suitable fasteners.

Profiled bars 10 present interiorly and extending longitudinally of the table are drawn into back-to-back juxtaposition in a manner facilitating the assembly and assuring the cohesion and integrity of the working table.

The profiled bars 10 rest, for example, on two metal crossbars 13, each held up by a removable or foldable support, such as, for example, by a stand or horse 14. Well understood, foldable or collapsible legs, which are integral with an auxiliary support or engageable therewith, may be provided in lieu of the horses 14.

The surface area and dimensions of the working table 1 correspond exactly to the standardized area and dimensions of insulating panels or plates 15.

As indicated, the profiled bars 10 and their borders 11 serve as slides for peripheral lugs or retaining elements 12 formed, for example, by an inner metal plate 16 sliding between the two flanges of the profile 10 and supporting themselves on the borders 11, and by an outer metal plate 17 projecting above the working surface of the table 1 for contact with or engagement of the sides of the panel 15, thereby assuring its proper positioning and its retention or wedging on the working table. The two plates 16 and 17 are locked for their arrestation against the profile borders or flanges 11, such as, for example, with the aid of a screw bolt 18 with wing nut, or then with the aid of magnetically actuated gripping devices.

The mobile working assembly 19 will now be described.

In particular, the profiled rail 2 is attached to a profiled bar 10 at one of the long sides of the working table 1. The profiled rail 2 is there joined or affixed in a known releasable manner, such as with the aid of bolts, the heads of which are retained or captured in a groove annexed to or provided in the profile. The profile of the rail 2 preferably is of generally square or rectangular cross-section and comprises at least three principal grooves, of which the two grooves 20 and 21 in opposed or top and bottom faces serve as rolling tracks for the carriage 3, and of which the sliding groove 22 in the lateral face is of trapezoid cross-section. The adjustable stops 23 are slidable in the groove 22 and may, for example, be of circular configuration and be arrested or immobilized by locking on the profile, such as with the aid of a screw.

These stops 23 mark the positions of the carriage for the groovings 24 and the cutting operation. To this effect, they cooperate with an element of the carriage which comes to a stop or abutment on them for the purpose of its immobilization. These stops 23 may, for example, comprise an indexing element, such as at 25.

The profiled rail 2 may, for example, have an auxiliary groove 26 on its lateral face above the sliding groove 22 for retaining a graduated band or ribbon 27 which is threaded or engaged in that groove.

Well understood, that ribbon may be mounted on the face ahead of or above the profiled rail 2 by all suitable means, such as adhesives, riveting, etc. Also, a profiled rail 2 may be provided which is already graduated in a groove in relief or by printing or depression.

In one of its variants according to an embodiment of the invention, the profiled rail 2 presents a track or two tracks for rolling engagement in relief or at its contour by the carrying 3 which, for that purpose, includes rolling means adapted thereto.

The mobile working assembly 19 is composed of the carriage and of the rectilinear element or guide 5 having an arm pivotally mounted on the upper portion of the carriage by an articulate joint 4.

Figure 4:
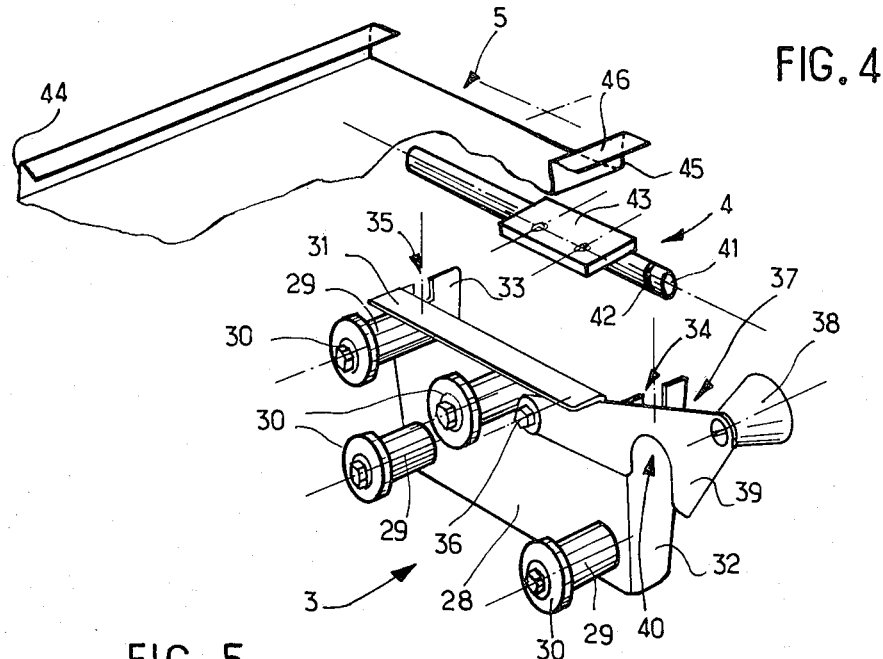
FIG. 4 is an exploded view of parts of a carriage and rectilinear tool guide employed in the apparatus according to an embodiment of the subject invention.
Figure 5:
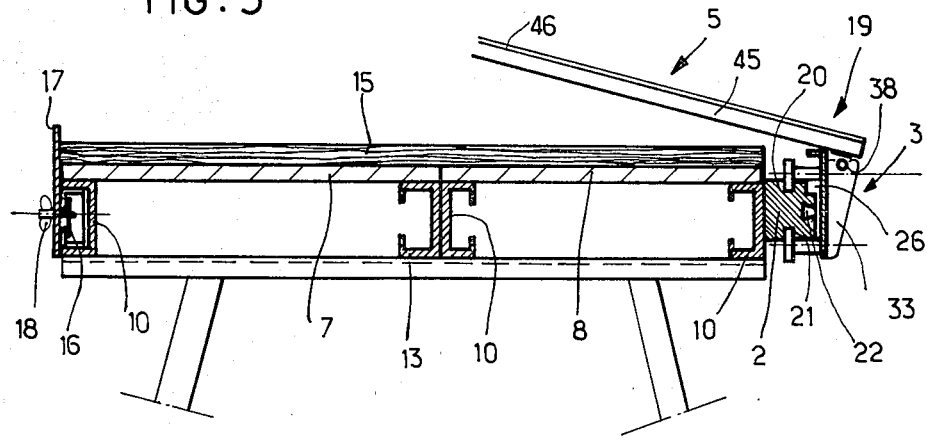
FIG. 5 is a section through the working table with carriage and tool guide.
Figure 6:
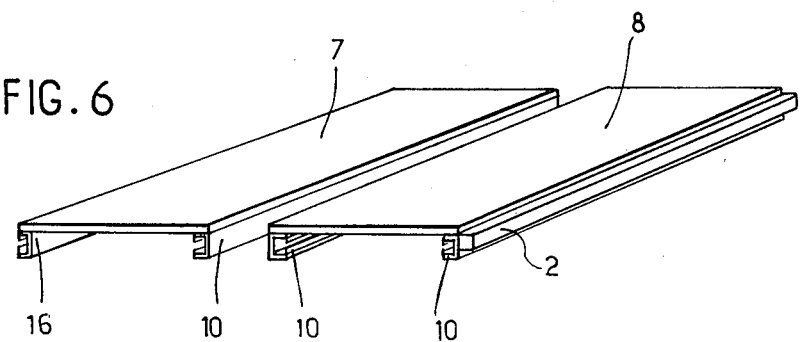
FIG. 6 is a perspective view of two disassemblable elements for forming the working table.

The body of the carriage is formed by a vertical base or plate 28 serving as a support or chassis for rolling means, such as, for example, four pulley-bearing axles 29 extending perpendicularly to the plate 28. The pulleys or rollers 30 have a cross-section adapted to the profiles of the rolling tracks 20 and 21. They interlock or mesh with the profile of the rail 2 and secure for the carriage good stability and true translatory motion. The frame 28 is extended forwardly at its upper portion as seen in FIG. 4 by a protective and supporting flange 31, and has two lateral flanges 32 and 33 including at their upper portions two apertures or notches 34 and 35, adapted to receive the articulation 4.

The frame 28 comprises also an auxiliary axis or pivot 36 which carries an arresting switch-lock element 37 having at a free end a graspable element in the form of a handle 38 rotatably mounted on a lever 39. This lever has a downwardly facing cut-out 40, having, for example, a semi-circular configuration adapted to catch or hook onto the adjustable stops 23 for the purpose of arresting the carriage 3 in position.

The articulation which joints the carriage 3 to the tool guide 5, or vice-versa, is, for instance, provided in the form of a shaft or axle 41 having at one of its extremities a single transverse or circumferential groove 42 for retaining the axle against lateral or axial movement upon engagement in the notch or aperture 34 or 35.

The shaft 41 carries a mounting plate 43 connected to the arm 5 for joinder with the tool guide. The latter may, for instance, have the form of a plate with raised straight edges 44 and 45 formed by a perpendicular flange at the plane of support and by a backup.

The straight edge 44 serves the guidance of the tool, and the backup 46 at the opposite side is directed outwardly for facilitating the setting of the tool guide.

The use of the apparatus according to the invention evidently is particularly simple. After the panel 15 has been put in place and propped against the retention lugs 12, it suffices to engage the roller-type carriage 3 on the profiled rail 2, to set the stops 23 at the appropriate locations with the aid of the inch, centimeter or other graduations 27 and index 25 for excecution of the grooving 24 at desired distances from the margin, to move the carriage to the level of the first stop, to arrest or immobilize it there and to effect the first groove with the hand tool 6 being moved or displaced along the tool guide 5. Upon completion of the first groove, the carriage 3 is displaced to the second stop, is there arrested in the above mentioned manner and the second cut is executed, and so forth, groove after groove.

The grooving of a panel is realized within a time substantially shorter than the time required for entirely manual tracing and cutting operations. For identical series of growing operations, the time savings are yet more significant and important in practice.

Figure 7:
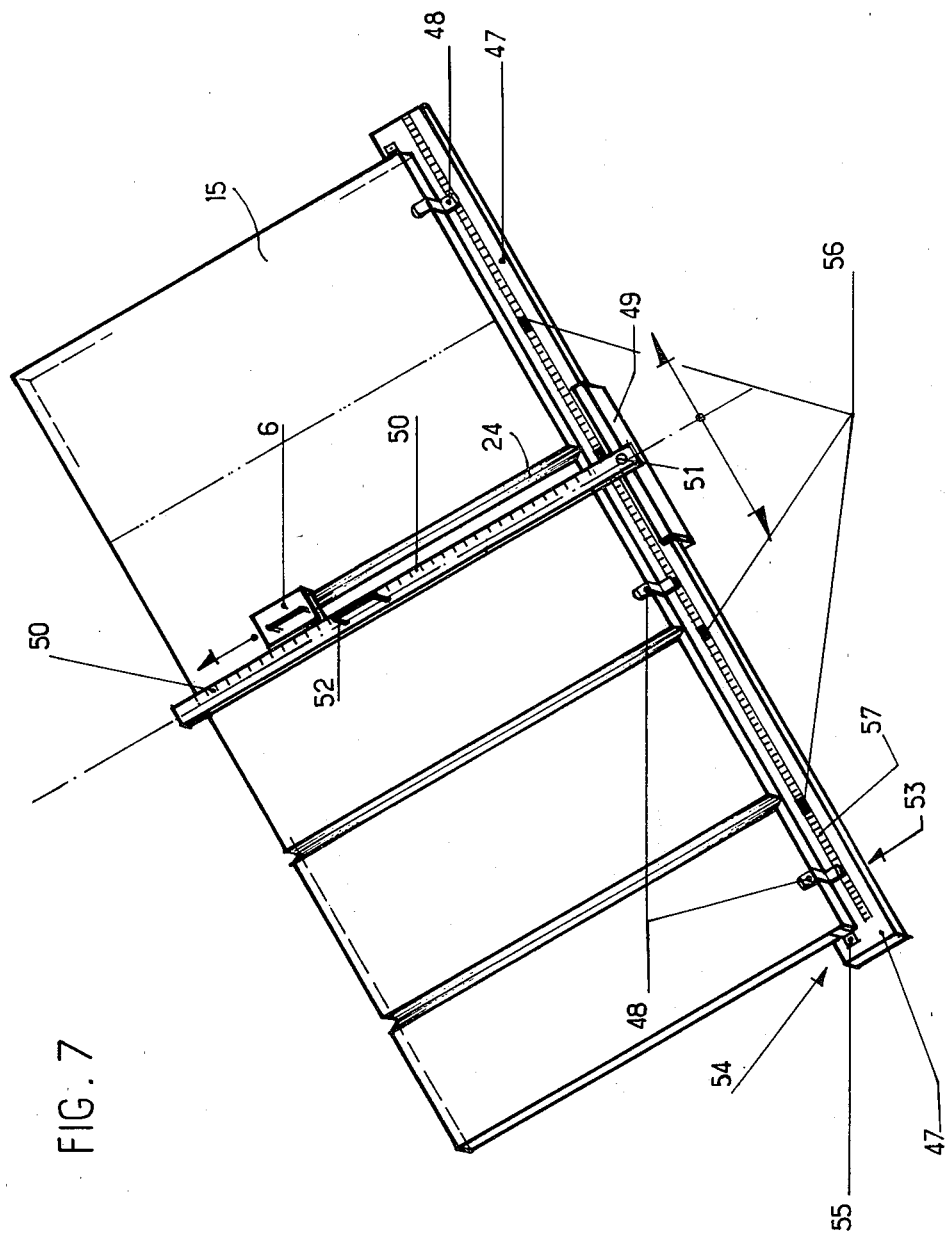
FIG. 7 is a perspective view of a panel grooving apparatus according to a further embodiment of the subject invention.

FIG. 7 illustrates a simplified modification according to an embodiment of the invention, employing a ruler 47 to which the isolation panel is applied at its lower longitudinal margin. It is there immobilized or retained by means of releasably retained claws or grippers 48 made preferably of steel for the benefit of an inherent spring effect.

The ruler 47 serves as a guide or slide for a shoe 49 of a rectilinear tool guide 50 extending perpendicularly to that ruler.

The guide 50 may be rendered adjustable or orientable by means of a pivot or articulation 51. The guide 50 comprises a handle 52 and provides a guide edge which serves to provide guidance to the grooving tool 6 for the execution of the grooved pattern 24.

The handle 52 assists a stable maintenance of the ruler for realizing a satisfactory immobilization of the panel, so that the grooving tool may be operated under optimum conditions.

The guide is mounted for angular movement in a plane perpendicular to the panel. The shoe 49 presents an open profile receiving snuggly the outer edge 53 of the ruler 47 which serves as a guide for sliding motion of the shoe.

The ruler 47 has a retention lug 54 at its extremity constituting a stop 55 in the form of an angle iron, such as shown.

The guide 50 or shoe 49 may be transversely blocked or selectively stopped in grooving position by removable or concealable stops 56 distributed along a graduation on the ruler 48 or reglets 57. These stops are drepressed or toggled upon passage of the guide.

In practice, the subject invention and its disclosed embodiments may be employed for grooving such materials as wood paneling and other sheet-like structure.

Moreover, the subject extensive disclosure will render apparent or suggest to those skilled in the art various modifications and variations within the spirit and scope of the invention.

We claim:

1. In panel grooving apparatus, the improvement comprising in combination:
   a table for supporting a panel at a working level;
   a rail along a side of the table;
   a working assembly mobile on said rail;
   means for selectively immobilizing said working assembly in various grooving positions, including stops movable and selectively arrestable along said rail and engageable by part of said working assembly; and
   movable peripheral elements on said table for releasably retaining said panel;
   said working assembly including a carriage movable in said rail, and a rectilinear tool guide having an arm articulated on said carriage;
   said carriage having a base and a plurality of axles supported by, and extending perpendicularly to said base, and pulleys rotatably mounted on said axles for rollingly engaging said rail;
   said base having two lateral flanges for pivotally mounting said arm, and an upper flange for supporting said arm;
   said base carrying a locking device for engaging said stops; and
   said locking device including a lever pivoted on said base and having a cut-out for engaging said stops for immobilizing the carriage, and a handle at a free end of said lever.

2. Apparatus as claimed in claim 1, wherein:
   said rectilinear tool guide has raised straight edges.

3. In panel grooving apparatus, the improvement comprising in combination:
   a table for supporting a panel at a working level;
   a rail along a side of the table;
   a working assembly mobile on said rail;
   means for selectively immobilizing said working assembly in various grooving positions, including stops movable and selectively arrestable along said rail and engageable by part of said working assembly; and
   movable peripheral elements on said table for releasably retaining said panel;
   said working assembly including a carriage movable on said rail, and a rectilinear tool guide having an arm articulated on said carriage; and
   said rail having two grooves in opposed faces thereof as rolling tracks for said carriage, and a third groove wherein said stops are slidable.

4. Apparatus as claimed in claim 3, wherein:
   said rail has a fourth groove for retaining a graduation facilitating setting of said stops.

5. Apparatus as claimed in claim 1 or 3, wherein:
   said table comprises two panels juxtaposed along their long sides and integrally mounted on a frame assembly of profiled metal bars carrying said rail and resting on table supports.

6. In panel grooving apparatus, the improvement comprising in combination:

a table for supporting a panel at a working level;
a rail along a side of the table;
a working assembly mobile on said rail;
means for selectively immobilizing said working assembly in various grooving positions, including stops movable and selectively arrestable along said rail and engageable by part of said working assembly; and
movable peripheral elements on said table for releasably retaining said panel;
said table comprising two panels juxtaposed along their long sides and integrally mounted on a frame assembly of profiled metal bars carrying said rail and resting on table supports; and
said retaining elements including an inner plate sliding between two flanges, and supporting itself on borders of one of said profiled metal bars, an outer plate projecting above a working surface of said table for engaging a slide of said panel, and means for releasably locking said inner and outer plates against said borders.

7. Apparatus as claimed in claim 6, wherein:
said working assembly includes a carriage movable on said rail, and a rectilinear tool guide having an arm articulated on said carriage.

8. Apparatus as claimed in claim 7 or 3, wherein:
said carriage has a base and a plurality of axles supported by, and extending perpendicularly to said base, and pulleys rotatably mounted on said axles for rollingly engaging said rail.

9. Apparatus as claimed in claim 8, wherein:
said base has two lateral flanges for pivotally mounting said arm, and an upper flange for supporting said arm; and
said base carries a locking device for engaging said stops.

10. Apparatus as claimed in claim 9, wherein:
said arm is articulated on said carriage by a shaft mounted on said lateral flanges, and by a mounting plate carried by said shaft and connected to said arm.

* * * * *